United States Patent [19]

Johncox et al.

[11] 4,367,068

[45] Jan. 4, 1983

[54] UNIVERSAL BICYCLE SPROCKET HUB

[75] Inventors: Ronald Johncox; Robert Kingsbury, both of Jackson, Mich.

[73] Assignee: Kingsbury Products Incorporated, Jackson, Mich.

[21] Appl. No.: 202,257

[22] Filed: Oct. 29, 1980

[51] Int. Cl.³ .................. F16H 55/30; F16H 55/12
[52] U.S. Cl. ..................... 474/162; 74/446; 74/447
[58] Field of Search ............ 474/162; 74/446, 447, 74/448, 594.1, 594.2, 151, 434, 439

[56] References Cited

U.S. PATENT DOCUMENTS

| | | |
|---|---|---|
| 763,993 | 7/1904 | Mason, Jr. .......................... 74/447 |
| 1,433,923 | 10/1922 | Anthony ............................ 474/162 |
| 2,436,694 | 8/1946 | Honrbrook, Jr. et al. ......... 474/152 |
| 3,613,472 | 10/1971 | Held .................................. 74/411 |
| 3,651,708 | 3/1972 | Müller ............................... 74/447 |
| 4,043,214 | 8/1977 | Westlake ........................... 74/448 |
| 4,144,773 | 3/1979 | Addicks ............................ 474/161 |
| 4,326,849 | 4/1982 | Van Zijderveld .................. 74/447 |

Primary Examiner—Leslie A. Braun
Assistant Examiner—Michael D. Bednarek
Attorney, Agent, or Firm—Beaman & Beaman

[57] ABSTRACT

The invention pertains to a bicycle drive sprocket hub which may be universally utilized with a plurality of bicycle chain sprockets of different manufacturers. The hub is preferably formed of a synthetic plastic material and is provided with a plurality of flat locating surfaces intersected by shoulder surfaces which cooperate with locating surfaces defined upon the chain sprocket. Openings are formed in the hub for receiving fasteners for affixing the sprocket thereto.

5 Claims, 10 Drawing Figures

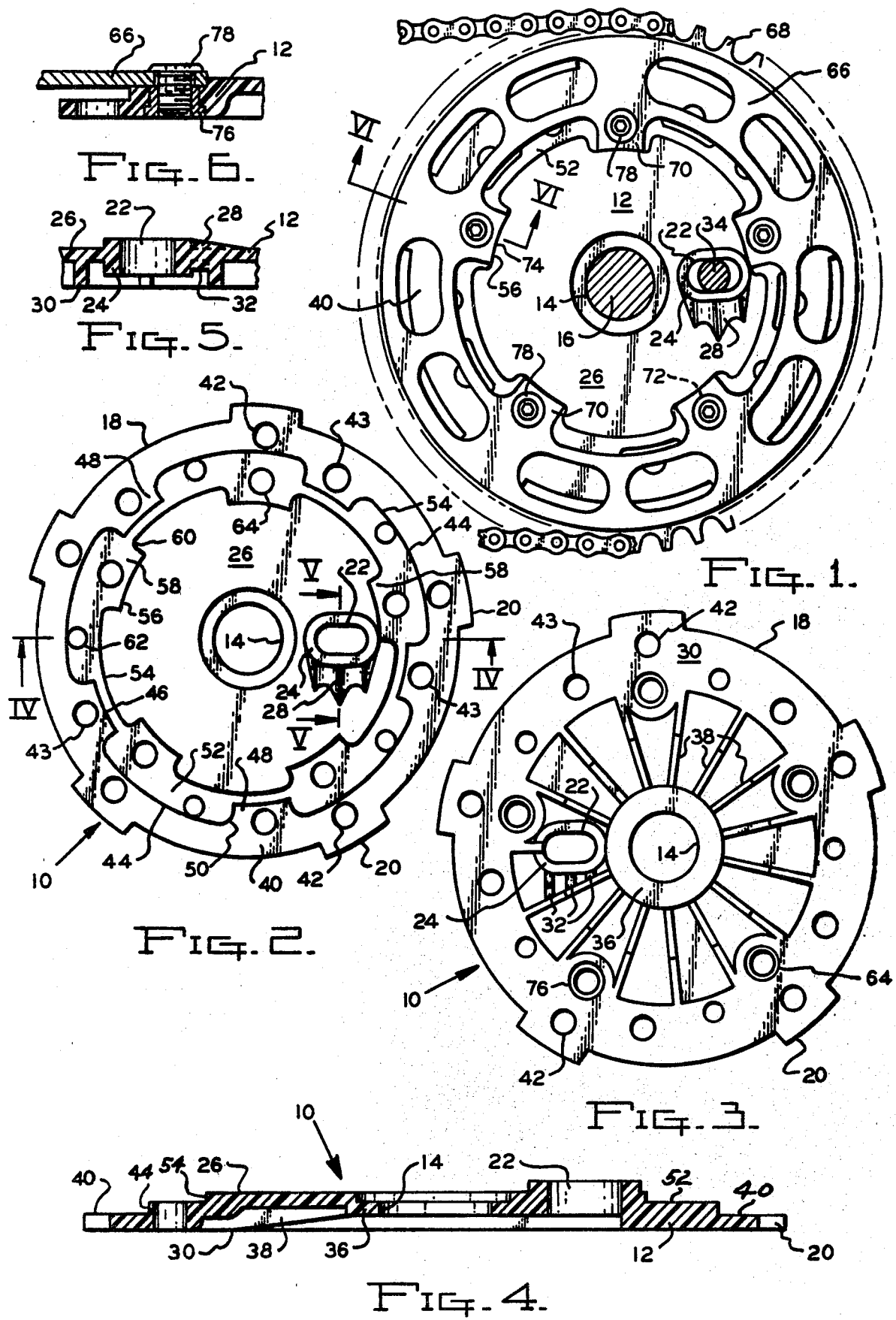

UNIVERSAL BICYCLE SPROCKET HUB

BACKGROUND OF THE INVENTION

A conventional bicycle chain drive sprocket consists of a sprocket mounted upon the bicycle crank having a hub portion, and a plurality of chain engaging teeth defined on the sprocket rim periphery. Such sprockets are widely used in single speed, three speed and ten speed bicycles. As the number of teeth formed in the sprocket periphery determines the speed transmission ratio between the crank sprocket and driven sprocket affixed to the rear wheel, the size of the crank sprocket, and the number of chain engaging teeth defined thereon, is predetermined to provide the desired speed ratio.

A form of bicycle racing has become popular commonly known as BMX racing utilizing a single speed bicycle of relatively small size which is pedaled over a variable terrain course. As such bicycles are of a single speed the transmission ratio between the drive sprocket and wheel sprocket can only be varied by the installation of different sized chain sprockets and it is common for the riders to change the size of crank drive sprocket rims to accomodate a particular race course, the size and strength of the rider, or for other reasons, and BMX riders normally carry several sizes of sprockets for use as desired.

To reduce the time and effort required to change the size of the crank sprocket rim on a bicycle manufacturers of BMX drive sprockets have produced a variety of sprocket peripheries of various size which may be mounted upon or detached from a hub permanently affixed to the bicycle crank. The hub is provided with threaded inserts, or bolt receiving holes, and includes locating surfaces thereon for centering the chain sprocket upon the hub and the fasteners will maintain the engagement of the locating surfaces defined upon the sprocket and hub.

As the locating surfaces and inner configuration of the various manufacturers of demountable sprocket rims differ from each other it has heretofore not been readily possible for the sprockets of different manufacturers to be mounted upon a single hub, and previously, the drive ratios available to a rider having a hub of a single manufacturer were limited to those ratios of chain sprockets manufactured by the particular manufacturer of the hub. As each manufacturer does not usually produce sprockets with single teeth differences the rider who wanted a drive sprocket which has only one tooth more or less than the sprocket being used would have to use a sprocket rim of a different manufacturer requiring the installation of a new hub upon the crank, which is a time consuming procedure. Accordingly, as a practical matter, a rider is limited to the speed ratios available from the manufacturer of the hub installed upon his bicycle, and while the several manufacturers of this type of demountable sprocket jointly produce a wide range of sprocket rim sizes varying only by a single tooth the rider's availability of such various sizes of sprockets of various manufacturers was limited by the requirement for installing a hub upon the crank to accomodate the sprocket of a particular manufacturer.

Demountable chain sprockets have been available for many years as shown in U.S. Pat. Nos. 1,433,923, and 2,436,694, and such demountable sprockets may use segmented tooth portions, or the sprocket may constitute a single piece, both types being shown in the aforementioned patents. Further, it is known to form a bicycle chain sprocket of synthetic plastic material and of such configuration as to be mountable upon a variety of crank spiders as shown in U.S. Pat. No. 4,144,733, and such a construction permits a single size sprocket to be mounted upon various types of bicycle crank spiders.

It is an object of the invention to provide a universal bicycle sprocket hub which may be mounted upon the bicycle crank and is capable of accomodating demountable chain sprocket rims of the major manufacturers of such sprockets whereby the sprockets of such manufacturers may be mounted upon a single hub thereby making available to the rider a selection of speed ratios available from a variety of sources.

A further object of the invention is to provide a universal bicycle sprocket hub upon which locating surfaces are mounted which are capable of accurately centering a plurality of constructions of demountable sprockets thereon, and wherein the sprockets may be quickly mounted or removed from the hub by means of threaded fasteners.

Another object of the invention is to provide a universal bicycle sprocket hub which is formed of a synthetic plastic material, is of an economical construction, of high strength, and which may be molded of attractive colors.

The bicycle sprocket hub of the invention is preferably molded of a high strength synthetic plastic and includes a central opening through which the bicycle crank is received and a crank pin opening receives the crank pin. A first radially extending locating surface is defined upon the hub adjacent its periphery and a plurality of axially extending shoulder surfaces intersect the first locating surface, the configuration of the shoulder surfaces including radially extending portions equally circumferentially annularly disposed about the hub axis. A second radially extending locating surface is inwardly disposed of the first locating surface, and two sets of axially extending shoulder surfaces intersect the second locating surface also defining radially extending portions equally annularly disposed about the hub axis.

A plurality of fastener receiving holes are defined in the hub extending in the axial direction and intersecting the locating surfaces whereby bolts, threaded inserts, or similar threaded fasteners are used to affix the chain sprockets to the locating surfaces, and the configuration of the sprockets is such that a flat surface thereof will be held against the associated hub locating surface.

The sprocket hub is reinforced on its inner side by a plurality of radially extending ribs, and reinforcement means are defined adjacent the crank pin opening for reinforcing the hub against crank pin driving forces.

BRIEF DESCRIPTION OF THE DRAWINGS

The aforementioned objects and advantages of the invention will be appreciated from the following description and accompanying drawings wherein:

FIG. 1 is an elevational view of a universal hub in accord with the invention having a sprocket mounted thereon in driving relationship with a bicycle chain, FIG. 2 is an elevational view of the outer side of a hub in accord with the invention, FIG. 3 is an elevational view of the inner side of the hub, FIG. 4 is an elevational view as taken along Section IV—IV of FIG. 2, FIG. 5 is an enlarged, detailed, elevational sectional view taken through the crank pin receiving opening along Section V—V of FIG. 2, FIG. 6 is an enlarged, detailed, elevational sectional view taken through a threaded fastener insert along Section VI—VI of FIG. 1, and FIGS. 7, 8, 9 and 10 are partial, elevational views of the universal hub of the invention having chain sprockets of various manufacturers mounted thereon.

DESCRIPTION OF THE PREFERRED EMBODIMENT

Figure 7:
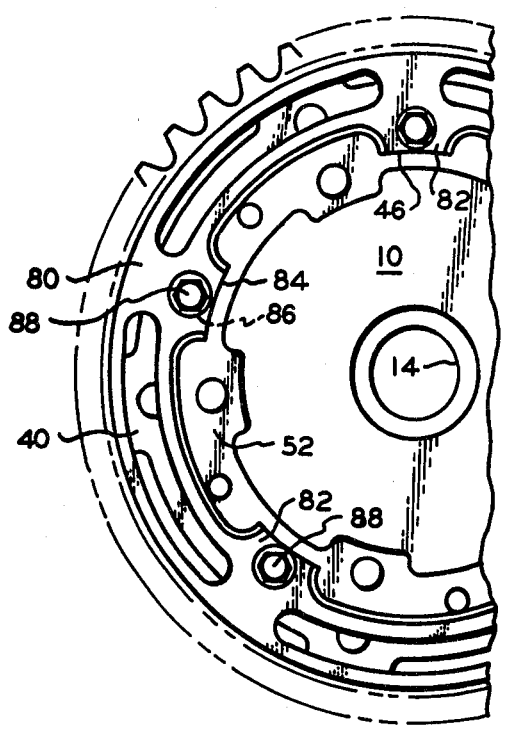

The universal bicycle sprocket hub in accord with the invention will be best appreciated from FIGS. 2–6 wherein the hub 10 comprises a generally circular body 12 preferably molded of a high strength synthetic plastic material such as polycarbonate. Of course, the hub 10 can be formed of metal, but its configuration is such as to be particularly conducive for forming by injection molding, and when formed of a synthetic plastic the hub body may be formed of an attractively colored material which augments the appearance of the bicycle.

The hub body 12 includes a central opening 14 which receives the bicycle crank 16 and, exteriorly, the hub is defined by a circular periphery 18 from which extend five radial extensions 20 for providing sufficient material to reinforce sprocket mounting holes, as later described.

An elongated crank drive pin receiving opening 22 is formed in the body 12 between the opening 14 and periphery 18 thereof, and the opening 22 is provided with a reinforcing rim 24, FIGS. 1 and 5. Further, the opening 22 is reinforced on the hub exterior side 26 by extra material 28 which tapers toward the plane of the body, FIG. 5, and on the inner side 30 of the hub the opening 22 is reinforced by ridges 32, FIG. 3. The material 28 and the ridges 32 are disposed on the side of the crank pin opening 22 against which the force generated by crank pin 34 is exerted when the hub is rotated in a bicycle driving direction.

On the hub inner side 30, the opening 14 is reinforced by a circular portion 36, FIG. 3 and a plurality of radially extending ribs 38 extend from the portion 36 to the outer portions of the hub and as the forces imposed upon the hub are in the general plane thereof the described construction provides sufficient strength even under vigorous cranking.

The outer hub side 26 is provided with a configuration which permits the mounting of a variety of bicycle chain demountable sprocket rims thereto. Mounting of the sprockets is upon locating surfaces defined upon the hub in cooperation with shoulder surfaces and fastener receiving holes, and the hub includes a first planar locating surface 40 disposed adjacent the periphery 18. The surface 40 is perpendicularly disposed to the axis of the hub body 12 and includes fastener receiving holes 42 defined therein, the holes having an axis parallel to the hub axis. The holes 42 are centered relative to the extensions 20 whereby an equal amount of material will be disposed about the holes, and the holes 43 are symmetrically related to hub shoulder surfaces, as later described.

A first shoulder surface 44 is defined upon the hub outer surface which perpendicularly intersects locating surface 40, and a second shoulder surface 46, disposed radially inwardly of shoulders 44 forms a recess 48 as defined by the convex merging surfaces 50. The axial dimensions of the shoulder surfaces 44 and 46 is substantially equal to the axial dimension of most demountable bicycle chain sprockets. As will be appreciated from FIG. 2, the holes 43 are symmetrically related to the recesses 48.

A second radially extending locating surface 52 is defined upon the hub outer surface 26 axially located "outwardly" from first locating surface 40. The second locating surface 52 has a periphery defined by the shoulder surfaces 44 and 46, and a third axial shoulder surface 54 perpendicularly intersects the locating surface 52. Fourth axial shoulder surface 56 intersects locating surface 52, and is radially disposed inwardly of surface 54 defining recesses 58 defined by convex merging surfaces 60.

Fastener receiving holes 62 are defined in the second locating surface 52, and the holes 64 defined in the second locating surface 52 are symmetrically related to the recesses 58. It will be appreciated that the axially extending shoulder surfaces 44, 46, 54 and 56 each comprise five cylindrical segments concentric with the axis of the hub, and each of the fastener receiving holes are five in number in that major demountable sprocket manufacturers utilize five mounting holes in their sprockets.

The relationship between the universal sprocket hub of the invention and the demountable chain sprockets of various manufacturers will be appreciated from FIGS. 1 and 7–10. With respect to FIG. 1, a 46 tooth demountable sprocket 66 manufactured by SunTour is mounted on the hub. The sprocket includes teeth 68, and internally includes five radially inwardly extending projections 70 each having a hole 72 defined therein. The projections 70 are inwardly provided with cylindrical segment surfaces 74 which engage the hub shoulder surfaces 56, and the holes 72 of the sprocket align with the hub holes 64. The inner flat side of the sprocket 66 engages the flat locating surface 52 of the hub 10, and the threaded fasteners consist of female threaded inserts 76 received within the hub holes 64, FIG. 6, and male headed threaded fasteners 78 having a hexagonal wrench receiving opening extending through the sprocket holes 72 hold the sprocket against the hub locating surface 52. Concentricity between the sprocket and hub is assured by the relationship of the surfaces 56 and 74.

In FIG. 7 a 45 tooth sprocket 80 is illustrated and this sprocket configuration includes radially inwardly projecting extensions 82 terminating in cylindrical segment surfaces 84. Fastener receiving holes 86 are defined in the extensions 82, and this sprocket is mounted to the hub by engaging the sprocket surfaces 84 with the hub shoulder surfaces 46 and placing bolts 88 through the hub holes 43 and the sprocket holes 86. Tightening of the bolts holds the sprocket against the hub locating surface 40.

Figure 8:
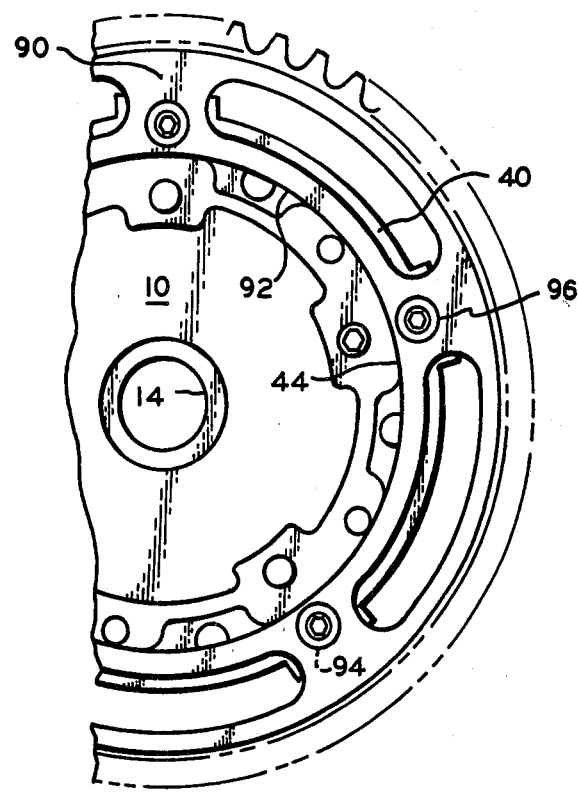

In FIG. 8 a 49 tooth sprocket 90 manufactured by Campagnolo is disclosed. This sprocket includes a continuous inner cylindrical surface 92 which closely engages the hub shoulder surfaces 44, and sprocket holes 94 aligned with hub holes 42 whereby bolts 96 extending through the aligned holes maintain the sprocket against the locating surface 40. Initial concentricity is assured by the relationship of the sprocket surface 92 and hub surface 44 and torque transmission is through the bolts 96.

Figure 9:
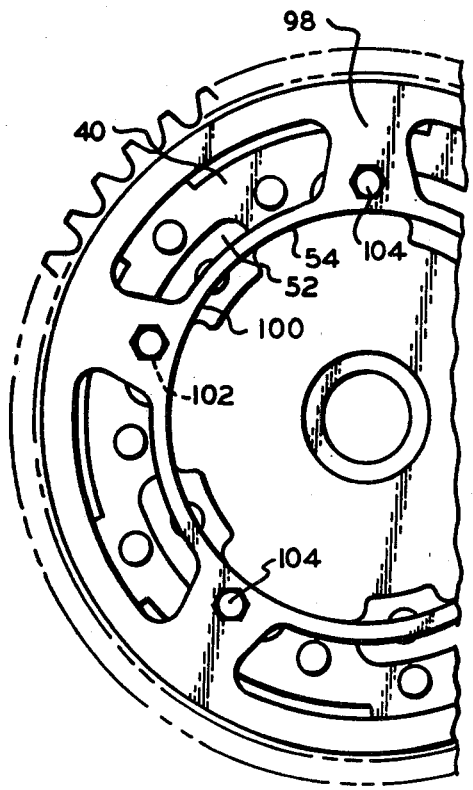

FIG. 9 discloses a 48 tooth sprocket 98 manufactured by Takagi, and this sprocket includes a continuous inner cylindrical surface 100 which is closely received against the hub shoulder surface 54 to assure concentricity with the hub. Holes 102 defined in the sprocket aligned with hub holes 62 and bolts 104 hold the sprocket against the hub locating surface 52.

Figure 10:
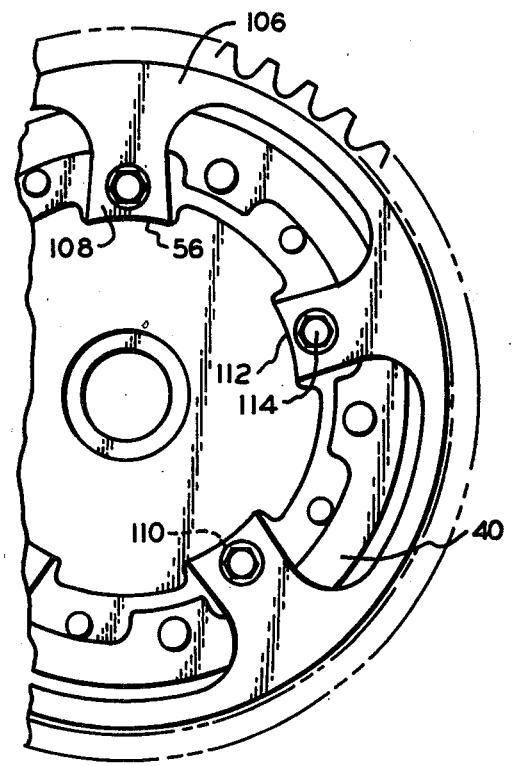

The 47 tooth sprocket 106 shown in FIG. 10 manufactured by Sugino includes five radially inwardly projecting extensions 108 having holes 110 defined therein, and the extensions are inwardly formed with cylindrical segment surfaces 112 which cooperate with the hub shoulder surfaces 56. Holes 110 align with hub holes 64 for receiving bolts 114 which firmly hold the sprocket against the hub locating surface 52.

It will be appreciated that the construction of the hub 10 permits a wide variety of sprockets to be affixed thereto, and the hub construction provides a firm support of the sprocket in that sides of the sprocket will be maintained against the hub radial locating surfaces, and the cooperation of the concentric sprocket surfaces with the concentric hub radial surfaces permits the sprockets to be quickly and accurately concentrically located on the hub prior to insertion of the threaded fasteners through the appropriate hole.

It is appreciated that various modifications to the inventive concepts may be apparent to those skilled in the art without departing from the spirit and scope of the invention.

We claim:

1. A universal bicycle chain sprocket hub for selective use with a plurality of chain sprockets wherein the sprockets comprise annular members having an axis, a toothed periphery, a flat side wall, fastener receiving holes radially spaced from and equally spaced about the axis and an inwardly facing locating surface concentric to the axis comprising, in combination, an annular body of generally circular configuration having a periphery, a central crank receiving opening having an axis, a first side and a second side, a crank pin receiving opening defined in said body intermediate said central opening and said periphery and intersecting said sides, said first body side including a first planar locating surface substantially perpendicular to said axis adjacent to and intersecting said body periphery, a plurality of first shoulder surfaces defined on said body first side concentrically radially spaced from said axis and evenly spaced angularly about said axis transversely intersecting said first locating surface, a plurality of second shoulder surfaces defined on said body first side concentrically radially spaced from said axis inwardly of said first shoulder surfaces and evenly spaced angularly about said axis transversely intersecting said first locating surface, a second planar locating surface substantially parallel to and axially spaced from said first locating surface defined on said first body side having a periphery substantially defined by said first and second shoulder surfaces, a plurality of third shoulder surfaces defined on said body first side concentrically radially spaced from said axis and evenly spaced angularly about said axis transversely intersecting said second locating surface, a plurality of fourth shoulder surfaces defined on said body first side concentrically radially spaced from said axis inwardly of said third shoulder surfaces and evenly spaced angularly about said axis transversely intersecting said second locating surface, and a plurality of sets of fastener receiving sprocket mounting holes defined in said first and second locating surfaces intersecting said body first and second sides, the holes of each set being equally angularly spaced about said central opening axis.

2. In a universal bicycle chain sprocket hub as in claim 1, said shoulder surfaces comprising circular segments concentric to said central opening axis.

3. In a universal bicycle chain sprocket hub as in claim 1, said annular body being formed of a synthetic plastic material.

4. In a universal bicycle chain sprocket hub as in claim 3 wherein said body second side includes an annular hub of increased axial dimension circumscribing said central opening, and a plurality of radially extending ribs defined upon said body second side extending from said hub.

5. In a universal bicycle chain sprocket hub as in claim 4, a reinforcing section defined on said body first and second sides adjacent said crank pin receiving opening of increased axial dimension and located relative to said crank pin receiving opening in the direction of hub rotation during bicycle driving.

* * * * *